United States Patent Office 3,133,792
Patented May 19, 1964

3,133,792
SLIP CAST CALCINED MAGNESIA PRODUCTS
Cecil M. Jones II, Worcester, Mass., assignor to Norton Company, Worcester, Mass., a corporation of Massachusetts
No Drawing. Filed Sept. 21, 1960, Ser. No. 57,405
5 Claims. (Cl. 23—201)

This invention relates to aqueous slip casting of magnesium oxide and more particularly to a procedure for aqueous slip casting of calcined magnesium oxide.

In the past, slip cast magnesia products have always been made from finely ground fused magnesia particles. In following the known practice, the magnesia is first conditioned for slip casting by fusing it before subjecting it to ball milling in order to control the shrinkage produced when the green molded product is subjected to the final firing procedure. It has further been found that particular control of particle sizes and other factors are essential even in the handling of a fused magnesia product in order to eliminate undue shrinkage and detrimental crazing. It thus has been the practice, in an attempt to prevent excessive hydration of the magnesia, to reduce the fused magnesium oxide to a very fine particle size while holding it in the aqueous slurry used in the slip casting process.

While heretofore it has been thought impossible to slip cast calcined magnesia because of the possibility of an excessive hydration during slip casting which in part contributes to the undue shrinkage which usually results upon firing an unfused mass, the present invention provides a procedure whereby magnesia which has been merely calcined can be cast in an aqueous slip under conditions whereby the shrinkage is kept within acceptable limits. In addition the present invention provides a further teaching through which the degree of surface crazing noted upon the firing of some molded shapes, can be controlled to minimize the occurrence of this defect in slip casting of either the fused or calcined form of magnesia product.

In the past it has been the practice with a fused magnesia product to first reduce it in size by crushing it in jaw or roll crushers to a range of below 46 mesh and the crushed material is screened for sizing in the range of through 46 mesh to plus 100 mesh, and minus 100 to plus 200 mesh. Thereafter the 46 to 100 mesh fused product may be dry milled and then ball milled in a water slurry to reduce it to a much finer size in the order of 325 mesh and finer. This is the finest mesh size that can be screened. Actual microscopic examination indicates that the finer particles resulting from this grinding action are in the order of 4 to 5 microns with most of the particles being under about 15 microns in size.

After the wet grinding operation, the slurry is drained from the mill and aged by storage in the wet slurry form for a period of about twenty-four hours. The aged product is then agitated and acid deflocculated in a high speed propellor type mixer and the 100 to 200 mesh fused grains are simultaneously mixed with the material being agitated. The deflocculating acid normally used is a 50% concentration of hydrochloric. The agitated and deflocculated slurry is then ready for pouring into the plaster molds.

The above described procedure is essentially the same method I use for the production of an aqueous slip with a calcined magnesia. Certain control procedures must be introduced, however, to avoid hydration of the calcined magnesia and minimize the shrinkage which would normally be expected to result upon the firing of a merely calcined mass of magnesia particles.

In following our teaching, the entire mass of calcined magnesia is wet ball milled for about 16½ hours to produce a finely divided mass having particles falling within a size range of 325 mesh and smaller. The resulting slurry is drained from the ball mill and aged for a period of about 24 hours and the aged mass may then be agitated, deflocculated and mixed with additional calcined magnesia grog having particles no larger than about 46 mesh. The resulting slurry may then be poured directly into the plaster molds.

It is essential in handling the calcined magnesia during milling and aging in the presence of moisture to treat the magnesia in such a way that it does not become hydrated to a detrimental degree. It has been found, by controlling the temperature and to some extent the atmospheric conditions surrounding the grinding and aging procedure, that hydration can be controlled. In the following this teaching, the calcined product aged under the conditions described below, can be slip cast in a plaster mold and thereafter fired with very little shrinkage and within the tolerance limits for shrinkage which have been found acceptable for the manufacture of a slip cast fused magnesia product.

In order to minimize the hydration of the calcined magnesia, I have found that the slurry drained from the wet ball milling step which is aged for a period of 24 hours, must be held under a controlled temperature condition. In the preferred performance of my invention the aging of the calcined slurry may very simply be performed in small masses in a cool atmosphere. Since the hydration of magnesia is an exothermic reaction, the heat resulting from the hydration must be controlled to slow down the further hydration and I have found that an entirely effective control can be maintained by aging the ball milled slurry of calcined magnesia in pails containing about 30 pound batches in which the slurry has a density of about 2.6. During the aging period used in following my preferred teaching, the temperature internally of the mass of the magnesia is not permitted to rise above about 35 degrees centigrade. This is accomplished by storing the pails during aging in a room where the temperature is controlled so that the center of the mass of the aging slurry stays below about 35° C. In following my preferred practice, the 30 pound pails mentioned above should be aged in a room controlled to have a temperature of about 20° C.

After the ball milled slurry has been suitably aged, it tends to harden and it is necessary to agitate the slurry to make it fluid. Simultaneously with the breaking up of the aged slurry, an acid is added in the form of hydrochloric or its equivalent of any convenient concentration to accomplish deflocculation of the particles in the slurry as is well known in the art.

Deflocculation is performed to distribute the milled particles of the calcined magnesia uniformly throughout the slurry. And, at this stage, additional grog of dry calcined crushed particles in the size range of 100 to 200 mesh is combined with the deflocculated finer ball milled particles. The finer deflocculated particles then serve to disperse and hold the larger sized particles mixed therewith in suspension.

The deflocculated mixed mass of aqueous slip is then stored in a blunging reservoir which serves to keep the mass homogeneous. The slurry at this stage will be found to be thixotropic and the viscosity of this mass will be found to vary from 600 to 3000 centipoises, which is desired so that the aqueous slip will flow into the plaster mold and yet the larger particles may be incorporated in the slip and carried along therewith in order to produce an ultimate product which has less shrinkage and more thermal shock resistance and which will be somewhat less dense.

The slip formed as above described may be poured into a mold and it has been found that if a circular mold is rotated while the slip is being poured, surface crazing of a crucible or the like can be controlled to a large extent. It is believed that when a slip is poured into a stationary mold, the finer particles in the slip tend to deposit on the surface of the mold as the water in the slip flows into the mold. In accordance with my invention, however, it is believed that, due to the centrifugal action resulting from rotating the mold, larger particles are deposited on the surface of the mold along with the finer particles so that if any crazing is present, it is dispersed and broken up so as not to form a serious defect in the ultimate product. I have found that upon rotating the mold at about 120 r.p.m. for an article having an outer diameter of about 8", made of a slip having 90 to 110 pounds of magnesia dispersed in about 3 to 4 gallons of water, that the above described crazing problem can be controlled.

The product poured into the plaster mold will usually be dried in about 30 minutes to a "leather-hard" consistency such that it can be manually handled upon removal from the mold. After the molded product has been removed from its mold and thoroughly dried at room temperature, it may be fired at a temperature within the range of from 1450 to 1650 degrees centigrade for a period of several hours to effect a crystallization of the molded product. In following my teaching, it has been found that a calcined magnesia product can be produced having a shrinkage of from about 4½% to 5½%. This compares quite favorably with the production of a molded object using an aqueous slip of fused magnesia by the conventional procedure wherein the fused product upon being fired shrinks in the order of from 4% to 4½%.

A typical example of a product produced in following our teaching is the following.

I have taken 100 pounds of a typical calcined magnesia having an analysis by weight as follows:

| | Percent |
|---|---|
| $MgO$ | 99.59 |
| $SiO_2$ | 0.10 |
| $Al_2O_3$ | 0.20 |
| $Fe_2O_3$ | 0.05 |
| $CaO$ | 0.05 |
| $B_2O_3$ | 0.01 |
| | 100.00 |

I formed it into a slurry with 3.75 gallons of water and ball milled this slurry for a period of 16½ hours in a 30 gallon porcelain ball mill with 180 pounds of porcelain balls approximately 1" in diameter. This slurry was drained and aged in pails of approximately four equally sized batches for a period of 24 hours. The pails were stored in a room having a temperature controlled to be substantially constant at between 18° C. to 20° C. The temperature within the mass of the slurry being aged was found to be 31° C. at the time of pouring into the pails and went down to an average of 28.5° C. for the four pails after 3 hours, after 6 hours an average of 26° C. was noted, and after 24 hours the temperature averaged 23° C. The aged masses were deflocculated by pouring acid in the several pails, the contents of which were then blended and agitated in a high speed propellor mixer. The quantity of acid added was 28 cc. of 50% HCl for the entire 100 pound mass of the ball milled product and simultaneously with the agitation 60 pounds of dry calcined fines in a size range of 100 to 200 mesh were added. The agitation and mixing were continued for about 10 minutes and then the slip was poured directly into a reservoir having a slow speed blunging action. At this point the slip is thioxotropic.

This slurry was poured from the reservoir into plaster molds to form crucibles 5⅝" in diameter by 12½" high, with a rounded bottom. The slurry remained in this mold for 2½ minutes so that a wall thickness of ⅛" was built up. During the filling of the mold, it was rotated at a speed of approximately 120 r.p.m. The thickness of the wall of the molded product was controlled by the length of the time period that the slurry was allowed to remain in the mold and when a proper wall thickness was built up, the excess slurry in the mold was poured back into the reservoir.

The above described molded crucible product was found to have dried to a "leather hard" condition in about 30 minutes and was stripped from the mold. The molded pieces taken from the mold were then dried in air for 4 days at room temperature and were then fired in a kiln at about 1570° C. for a period of about 6 hours. The resulting fired crucibles were found to have shrunk about 4.9% compared with the dried product before firing.

It is evident that, in following the invention described above, I am able to slip cast calcined magnesia products having equally good properties for use in laboratory ware such as crucibles and the like and various refractory muffles, tubes, boats, etc., as may be produced in following the conventional practice of slip casting fused magnesia. As distinguished from the conventional practice, however, my procedure results in a considerable saving in cost by elimination of the necessary preliminary fusing of and crushing of the harder fused magnesia. As above stated, by carefully controlling the aging temperature of the ball milled calcined magnesia, an equally usable slip may be formed from the calcined material. Heretofore, it has never been thought possible to slip cast such a material where shrinkage during the firing step was a problem. I have discovered a procedure for control of the hydration of the calcined product which makes it possible to aqueous slip cast such a material in substantially the same manner as a fused magnesia product while limiting the shrinkage encountered in firing the calcined product to substantially the same range as that encountered upon firing a fused magnesia aqueous slip casting.

Furthermore, it has been shown that the ultimate product resulting from the casting of products from an aqueous slip made from calcined magnesia can be improved by rotating the mold while the slip is being poured. The rotation seems to provide a sufficient centrifugal action within the liquid mass of the casting to effect a proper distribution of the particle sizes so that as the slip dries and hardens, larger particles are more or less uniformly distributed in the surface layer with the smaller particles. Upon being fired, the surface and subjacent layers of the product which contain a more uniform particle size distribution, have an equal rate of shrinkage with the interior masses of the article and this uniformity serves to substantially eliminate or minimize surface crazing. This centrifugal slip casting action has been found useful in the casting of other types of refractory ware where gap sized grains are present. In any such situation where a significant proportion of fines is mixed with a significant proportion of relatively much larger sized particles, the fines tend to be drawn to the surface layer when the plaster mold is allowed to remain stationary. This produces a non-uniform distribution of the finer sized and relatively larger sized particles within the mass of the casting and upon firing, crazing usually results. When the mold is rotated at a speed sufficiently high to urge the larger sized particles outwardly toward the surface, the larger particles and finer particles are more uniformly disposed at the surface layer so that firing can be accomplished usually without a surface crazing condition resulting or at least with a greatly minimized crazing on the surface.

I prefer to obtain our magnesia by firing magnesium carbonate to drive off the $CO_2$ leaving magnesia; however, any sufficiently pure magnesia may be used. I have found that lime is a critical impurity and should never be permitted to exceed on a weight basis, the amount of silica present as an impurity and any amount of lime over 1% by weight will be detrimental because it will hydrate. For certain uses as much as 2% by weight of silica may be present but where the molded product is to be used with plutonium the silica may be a contaminant. Iron oxide impurities as high as 0.15% and alumina as high as 0.35% by weight may be tolerated.

The above description is intended to give a typical example of the preferred practice of our invention. It is to be understood that many modifications thereof may occur to those skilled in the art which will fall within the scope of the following claims.

I claim:

1. The method of aqueous slip casting a calcined magnesia product comprising ball milling a mass of calcined magnesia in the presence of water to a very fine particle size in the order of 325 mesh and smaller, aging the aqueous slurry, and controlling the temperature during milling and aging, such that the slurry is always cooler than about 35° C., deflocculating the aged mass and flowing the aqueous slip into a slip casting mold, removing the casting from the mold and firing it at a sintering temperature.

2. The method of aqueous slip casting a calcined magnesia product comprising ball milling a mass of calcined magnesia in a single grinding stage in the presence of water to a very fine particle size in the order of 325 mesh and smaller, aging the aqueous slurry, and controlling the temperature during milling and aging such that the slurry is always cooler than about 35° C., deflocculating the aged mass and flowing the aqueous slip into a slip casting mold, removing the casting from the mold and firing it at a sintering temperature.

3. The method of aqueous slip casting a calcined magnesia product comprising ball milling a mass of calcined magnesia in the presence of water to a very fine particle size in the order of 325 mesh and smaller, aging the aqueous slurry, and controlling the temperature during milling and aging such that the slurry is always cooler than about 35° C., deflocculating the aged mass, mixing in a substantial portion of larger sized dry fines in the order of less than 100 mesh and flowing the aqueous slip into a slip casting mold, removing the casting from the mold and firing it at a sintering temperature.

4. The method of aqueous slip casting a calcined magnesia product comprising ball milling a mass of calcined magnesia in the presence of water to a very fine particle size in the order of 325 mesh and smaller, aging the aqueous slurry in 30 pound lots for a period of about 24 hours and controlling the temperature during milling and aging such that the slurry is always cooler than about 35° C., deflocculating the aged mass and flowing the aqueous slip into a slip casting mold, removing the casting from the mold and firing it at a sintering temperature.

5. The method of aqueous slip casting a calcined magnesia product comprising ball milling a 100 pound mass of calcined magnesia in the presence of water to a particle size in the order of 325 mesh and finer, aging the aqueous slurry in 30 pound lots for a period of about 24 hours, and controlling the temperature during milling and aging such that the slurry is always cooler than about 35° C., deflocculating the aged mass, mixing in about 60 pounds of dry fines in the order of 100 to 200 mesh size and flowing the aqueous slip into a slip casting mold, removing the casting from the mold and firing it at a sintering temperature.

References Cited in the file of this patent

UNITED STATES PATENTS

| | | |
|---|---|---|
| 2,219,725 | Seaton | Oct. 29, 1940 |
| 2,281,477 | Chesny | Apr. 28, 1942 |
| 2,640,759 | Hughey | June 2, 1953 |

FOREIGN PATENTS

| | | |
|---|---|---|
| 803,358 | Great Britain | Oct. 22, 1958 |
| 529,614 | Great Britain | Nov. 25, 1940 |
| 530,364 | Canada | Sept. 11, 1956 |